United States Patent
Cormier

(10) Patent No.: US 7,590,881 B2
(45) Date of Patent: Sep. 15, 2009

(54) METHOD AND APPARATUS FOR CONTROLLING AN UPPER LAYER IN A PROTOCOL STACK TO DELAY TIMEOUTS

(75) Inventor: Jean-Philippe Paul Cormier, Ottawa (CA)

(73) Assignee: Research In Motion Limited, Waterloo (CA)

( * ) Notice: Subject to any disclaimer, the term of this patent is extended or adjusted under 35 U.S.C. 154(b) by 690 days.

(21) Appl. No.: 10/965,762

(22) Filed: Oct. 18, 2004

(65) Prior Publication Data

US 2006/0085547 A1    Apr. 20, 2006

(51) Int. Cl.
G06F 1/24 (2006.01)
G06F 15/163 (2006.01)

(52) U.S. Cl. ........................ 713/600; 709/228
(58) Field of Classification Search ................. 713/600, 713/601; 726/11, 12; 709/203, 227, 228
See application file for complete search history.

(56) References Cited

U.S. PATENT DOCUMENTS

| | | | |
|---|---|---|---|
| 5,949,861 A | 9/1999 | Chan et al. | |
| 6,222,857 B1 | 4/2001 | Kammer et al. | |
| 6,563,599 B1 | 5/2003 | Whitfield | |
| 7,089,302 B1* | 8/2006 | Churchyard et al. | 709/224 |
| 7,330,894 B2* | 2/2008 | Vallone | 709/227 |
| 2002/0188743 A1* | 12/2002 | Schaffrath | 709/230 |
| 2003/0200255 A1 | 10/2003 | Vallone | |
| 2006/0168262 A1* | 7/2006 | Frazer | 709/230 |

FOREIGN PATENT DOCUMENTS

WO   WO 2004/008709    1/2004

OTHER PUBLICATIONS

Bhavin Bharat Bhansali, Man-In-the-Middle-Attack, As part of GIAC practical repository, Feb. 16, 2001.
Ess, T.H., Institute of Electrical and Electronics Engineers: "Accessing Devices Using a Web Service", Apr. 5-7, 2002.
Ajay Bakre et al., "I-TCP: Indirect TCP for Mobile Hosts", May 30, 1995.

* cited by examiner

*Primary Examiner*—Ellen Tran
(74) *Attorney, Agent, or Firm*—Moffat & Co.

(57) ABSTRACT

In a device communicating over a network, a proxy to delay timeout of an application on the device where the proxy is on a communications path between the application and the network, the proxy comprising means for registering a data request from the application to the network; a counter for measuring a predetermined time interval, the time interval selected to prevent timeout at the application; means to send preventative data to the application after the counter has expired but before a response is received; means for modifying a response received from the network to remove preventative data already sent to the application, creating a modified response; and means for forwarding the modified response to the application, wherein the proxy registers that a message has been sent and waits a predetermined interval, and if a response has not been received during that interval sends the preventative data to the application to delay a timeout.

17 Claims, 3 Drawing Sheets

US 7,590,881 B2

METHOD AND APPARATUS FOR CONTROLLING AN UPPER LAYER IN A PROTOCOL STACK TO DELAY TIMEOUTS

FIELD OF THE APPLICATION

The current application deals with a method and apparatus for fully or partially controlling the behaviour of an upper layer in a protocol stack by augmenting the amount of coupling between the lower and upper layer, and specifically a method and apparatus for delaying timeouts by providing coupling between an application and a transport layer.

BACKGROUND

Certain applications such as browsers have a very short timeout period when requesting information from a serving host. For example, when using HTTP on wireless networks, sometimes HTTP responses can take quite some time to reach the device. If the application such as a browser doesn't take into account the latency associated with wireless networks, the user experience with that browser will not be similar to browsing on a computer using a wired connection.

Even with wired connections, sometimes the browser may timeout prematurely, degrading the user's experience with the application.

SUMMARY

The present application relates to the coupling of an application layer and an underlying transport layer in any protocol stack. In one embodiment, the HTTP layer and the TCP layer in a TCP/IP stack are coupled. Any application using similar data transport could require the method and apparatus as taught herein.

The present application couples the TCP and HTTP layers in the preferred embodiment so an application such as a browser is in effect tricked into thinking it is in the process of receiving the incoming server response even though the device hasn't received any data yet. This can be used in the case of an application with a short timeout period that is using a high latency network to receive data and the method and apparatus of the present application thus extends the timeout long enough for the response to be received and relayed to the application.

In a preferred embodiment, a browser will typically receive a standard header to all data requests. A typical header will have the letters HTTP/with the version number. This version number is typically 1.x where x can be an integer. In a preferred embodiment, individual letters from this header can be sent to the browser with a delay between the sending of each of these letters. Alternatively, groups of letters or the entire first part of the header can be sent, thus delaying the timeout.

Once a response is received, the response is relayed to the application taking out the portions of the header that have already been sent.

The present application therefore provides, in a device communicating over a network, a proxy to delay timeout of an application on the device where the proxy is on a communications path between the application and the network, the proxy comprising: means for registering a data request from the application to the network; a counter for measuring a predetermined time interval, the time interval selected to prevent timeout at the application; means to send preventative data to the application after the counter has expired but before a response is received; means for modifying a response received from the network to remove preventative data already sent to the application, creating a modified response; and means for forwarding the modified response to the application, wherein the proxy registers that a message has been sent and waits a predetermined interval, and if a response has not been received during that interval sends the preventative data to the application to delay a timeout.

The present application further provides a method for delaying the timeout of an application on a device communicating over a network, the method comprising the steps of: registering that a request for data has been sent by the application to the network; waiting a predetermined interval; if a response to the request has not been received, sending data to the application to prevent a timeout; and repeating the waiting step; and if a response to the request is received, modifying the response to remove from the response data sent to the application; and forwarding the modified response to the application.

BRIEF DESCRIPTION OF THE DRAWINGS

The present application will be better understood with reference to the drawings in which.

DETAILED DESCRIPTION OF THE DRAWINGS

Figure 1:
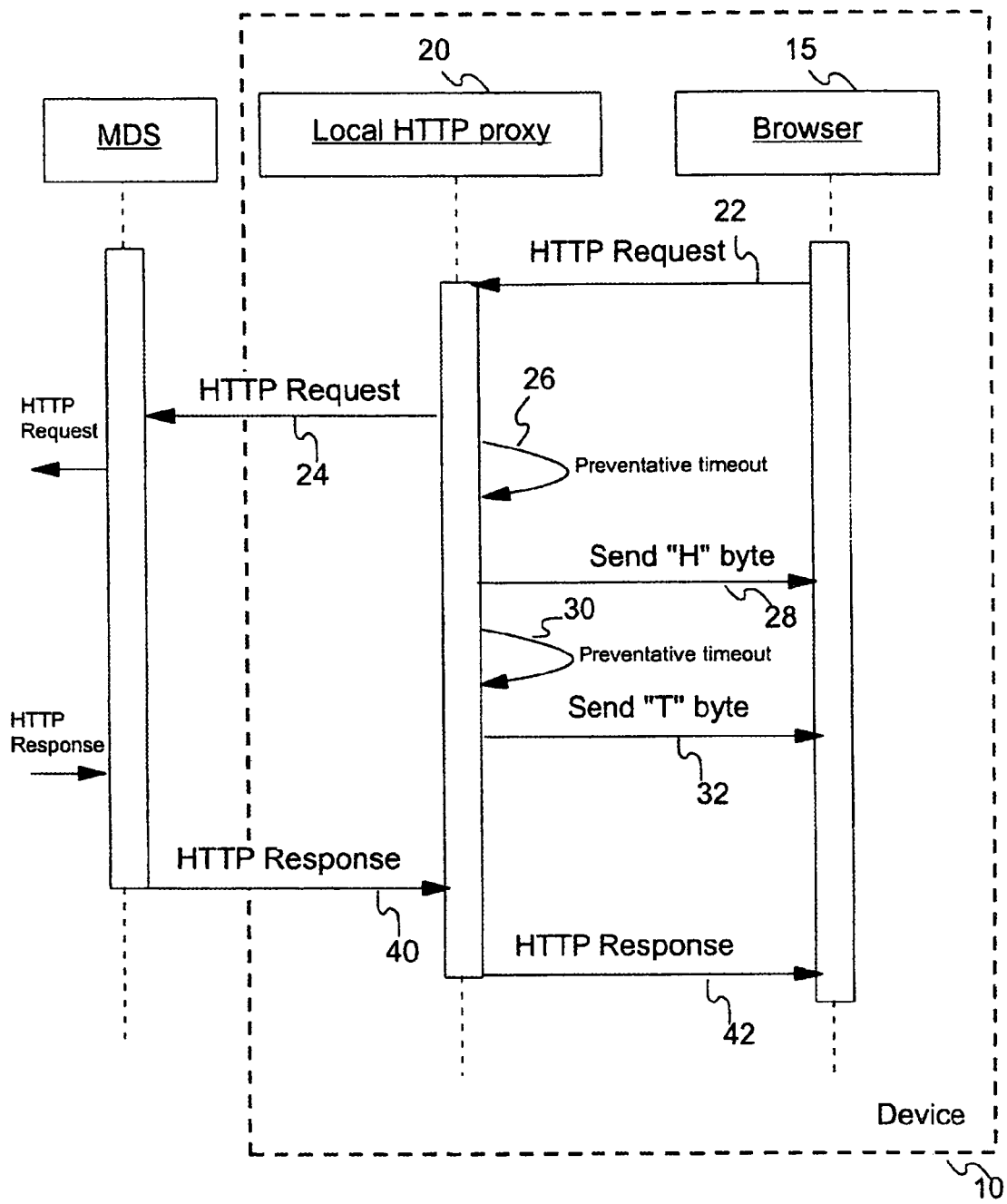
FIG. 1 is a block diagram showing data flow according to the method and apparatus of the present application.

Reference is now made to the drawings. FIG. 1 shows a device 10 for running applications and having a means for communicating with a network. In a preferred embodiment, device 10 is a wireless device with data capabilities as will be described in more detail below. However, as will be appreciated by one skilled in the art, other devices could be used.

Device 10 includes an application 15 running on the device. Application 15 includes a component for requesting and receiving data over a network. In order to accomplish this, device 10 further includes a proxy 20 located between the application 15 and the transport layer in a protocol stack.

The present application will be described with regard to a browser for the data network with proxy 20 being a local HTTP proxy. The transport layer will be the TCP layer in this example. However, as will be appreciated by one skilled in the art, other applications using similar data transport could be implemented using the present method and apparatus.

When application 15 needs data from a remote source across a network, a request 22 is made. Request 22 is communicated between application 15 and proxy 20. This request is then forwarded to the network as a request 24.

Figure 2:
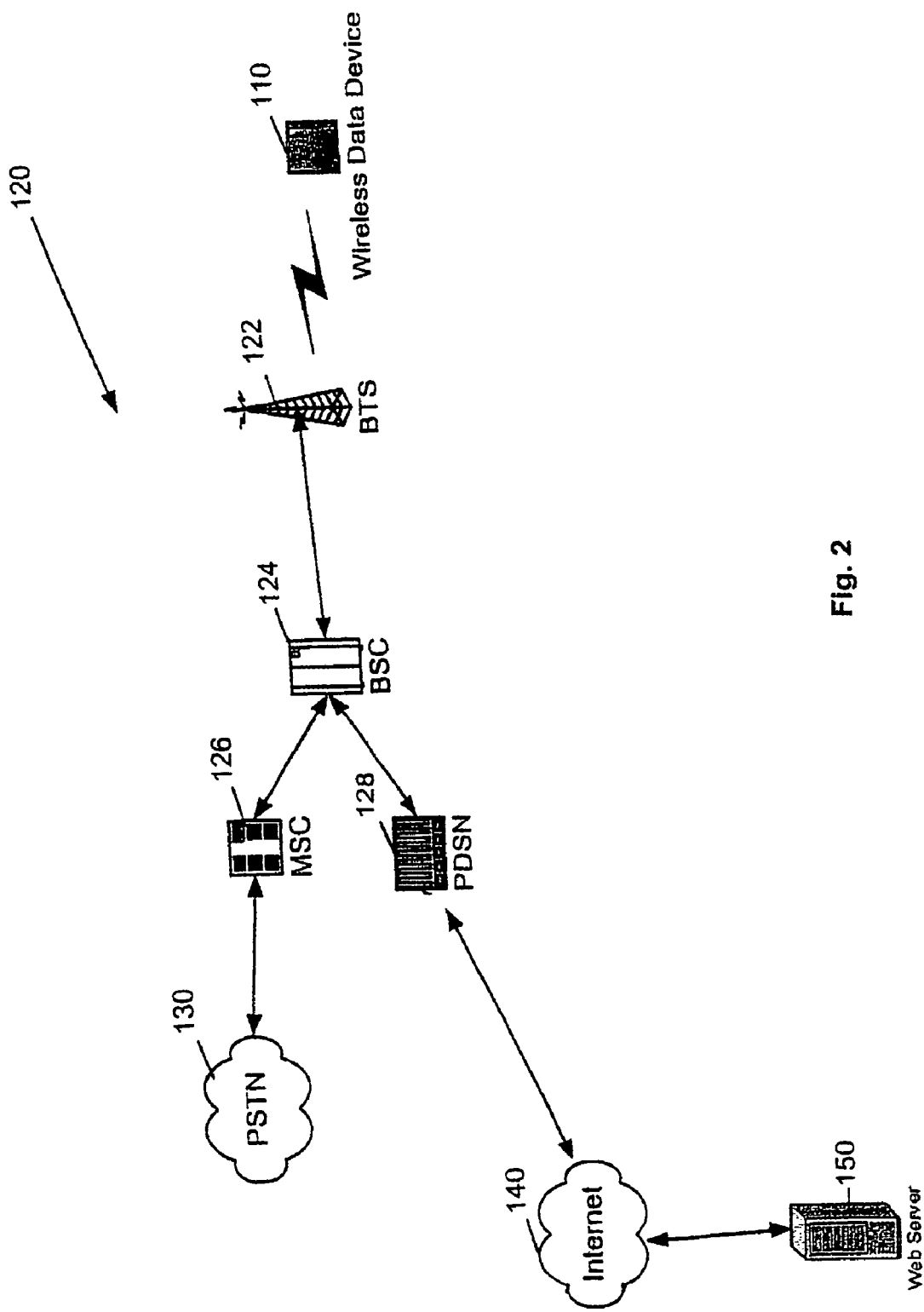
FIG. 2 is a diagram of an exemplary data communication network.

Reference is now made to FIG. 2. FIG. 2 is a block diagram of an exemplary wireless data network system in accordance with the present application and with which the various embodiments of the method of the instant application may cooperate. FIG. 2 shows a block diagram of a wireless data device 110, an exemplary mixed circuit switched and packet switched network 120, a Public Switched Telephone Network (PSTN) 130, data network 140 and web servers 50 with which the instant techniques of this application may cooperate. The wireless data device 110 is preferably a two-way communication device having data and/or voice communication capabilities.

Network 120 includes mixed circuit and packet switched components—Base Transceiver Subsystem (BTS) 122 and Base Station Controller (BSC) 124, a circuit switched only component—Mobile Switching Centre (MSC) 126, and a packet switched only component—Packet Data Serving Node (PDSN) 128.

Operationally, mobile device 110 communicates wirelessly with BTS 122 and BSC 124 to gain access to circuit switched services provided by MSC 126, such as voice and short message service (SMS) via PSTN 130.

Mobile device 110 also communicates wirelessly with BTS 122 and BSC 124 to gain access to packet data services provided by PDSN 128, such as e-mail, wireless application protocol (WAP), and other data services via data network 140.

As will be appreciated by one skilled in the art, delays can occur throughout network 120. General wireless network conditions can cause some delays. Further, fragmenting, encrypting and relay processing delays can occur at PDSN 128. TCP connectivity delays and web server 150 request processing delays further exist.

Reference is again made to FIG. 1. If application 15 has a short timeout period, local proxy 20 will know this. In order to prevent a timeout, data can be sent between proxy 20 and application 15.

As illustrated in the example of FIG. 1, in the case of an HTTP request, the HTTP header is always the same regardless of the type of message received. This HTTP header is HTTP/1.x where x represents a version number. The local proxy can therefore send "HTTP/1." to application 15 and still be able to pass the correct message when it ultimately arrives.

As will be appreciated by one skilled in the art, application 15 can be configured in various ways. In the example of FIG. 1, one byte of data received prior to the timeout is sufficient to maintain application 15 from timing out. In this case, local proxy 20 has not yet received a response from the network and thus generates a first header byte. This first header byte is communicated to local proxy 20 as if it was received from an outside network and thereby is forwarded to application 15. In the case of FIG. 1, the "H" byte is sent as a preventive timeout message 26 and is forwarded as received message 28.

Similarly, after a time period has elapsed and no response has yet been received from the network, local proxy 20 again sends out a preventative timeout message 30, which, in the example of FIG. 1, is a "T" byte. This is sent as response 32 to application 15 thereby preventing application 15 from timing out.

In the example of FIG. 1, a response 40 is then received from the network and is forwarded as response 42 to application 15. As will be appreciated by one skilled in the art, local proxy 20 removes the header bytes that have already been sent to application 15 from response 42 thereby allowing browser 42 to have a complete response and not generate any errors.

The sending of individual bytes to prevent timeout could have continued if response 40 had not been received, with each byte being sent after a predetermined interval. The predetermined interval could be determined based on the application 15 and could be tailored to be close to the timeout period of this application. For example, in one embodiment, a 30-second delay could be implemented between the sending of individual bytes.

In some cases, application 15 will still timeout after it receives an individual byte. This may be because an individual byte may not be sufficient to prevent a timeout and a longer word is required. In this case, groups of bytes could be sent together or the entire header portion could be sent as one message. As will be appreciated by one skilled in the art, if the entire header is sent at one time, then only one delay will exist between request 24 and a timeout being sent.

If a response 40 is not received after the entire header has been sent, local proxy 20 will allow application 15 to timeout.

Local proxy 20 includes intelligence to know that a request has not been received and thereby forward data to an application 15 to prevent application 15 from timing out. This data forwarding must be accomplished within a predetermined time period to prevent the timeout, known by a counter at proxy 20. Further, when a request is ultimately forwarded, it needs to take into account data that has already been sent to application 15.

The advantage of the above will be best understood in relation to a wireless network. When using HTTP on a wireless network sometimes HTTP responses can take quite some time to reach the device. If the browser's implementation doesn't take into account the latency associated with wireless networks, the user experience with that browser would not be similar to browsing with a personal computer on a wired connection. The server timeouts will become more important when the browser uses a virtual private network (VPN) or proxies which cause even more latency. The result is expense (cost) to the user who has to reissue an HTTP request for every useless timeout. The present method and application therefore reduces this by creating a longer timeout to accommodate the response latency.

As will be appreciated by one skilled in the art, the above is implemented completely above the transport layer and does not interfere with HTTP responses or request data in any way and abides by all the rules set by the protocols that it manipulates.

As will be further appreciated by those skilled in the art, the present system and method could be used with other devices besides wireless devices or could be used with other applications besides an HTTP application or a TCP layer in the protocol stack. In this case, the header associated with the data transport will be used instead of "HTTP/1." as described in the above example.

The coupling between the application layer and the transferred layer is accomplished by adding a layer between these two layers to ensure that the transport layer knows about the application layer and vice versa. With HTTP, TCP is always used and the midlayer is thus the glue between these two layers.

Figure 3:
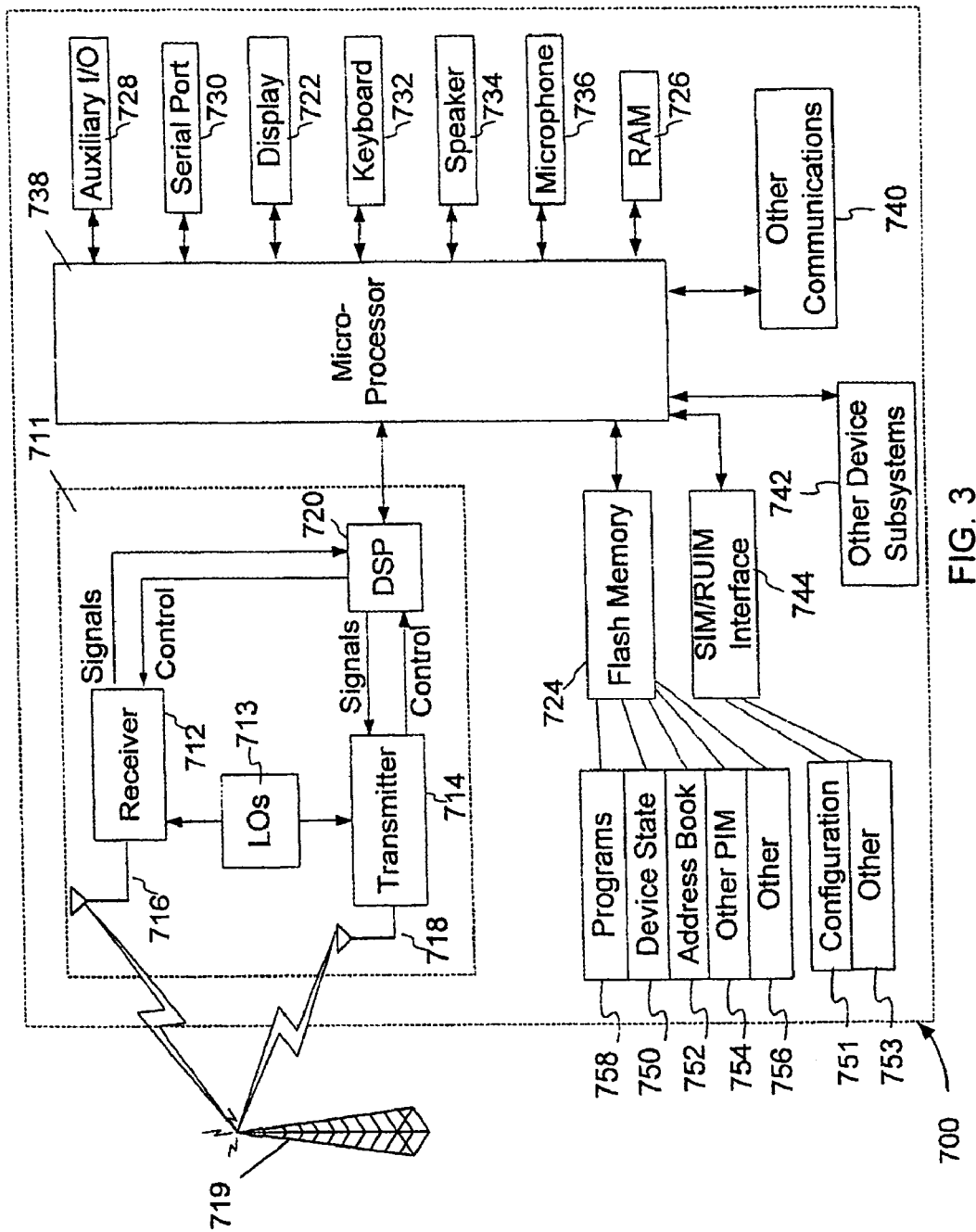
FIG. 3 is a block diagram of an exemplary device implementing the method and apparatus of the present application.

Reference is now made to FIG. 3. FIG. 3 is a block diagram illustrating a mobile station apt to be used with preferred embodiments of the apparatus and method of the present application. Mobile station 700 is preferably a two-way wireless communication device having at least voice and data communication capabilities. Mobile station 700 preferably has the capability to communicate with other computer systems on a data network. Depending on the exact functionality provided, the wireless device may be referred to as a data messaging device, a two-way pager, a wireless e-mail device, a cellular telephone with data messaging capabilities, a wireless data network appliance, or a data communication device, as examples.

When mobile station 700 is enabled for two-way communication, it will incorporate a communication subsystem 711, including both a receiver 712 and a transmitter 714, as well as associated components such as one or more, preferably embedded or internal, antenna elements 716 and 718, local oscillators (LOs) 713, and a processing module such as a digital signal processor (DSP) 720. As will be apparent to those skilled in the field of communications, the particular design of the communication subsystem 711 will be dependent upon the communication network in which the device is intended to operate. For example, mobile station 700 may include a communication subsystem 711 designed to operate within the Mobitex™ mobile communication system, the DataTAC™ mobile communication system, GPRS network, UMTS network, EDGE network or CDMA network.

Network access requirements will also vary depending upon the type of network 719. For example, in the Mobitex and DataTAC networks, mobile station 700 is registered on the network using a unique identification number associated with each mobile station. In UMTS and GPRS networks, and in some CDMA networks, however, network access is associated with a subscriber or user of mobile station 700. A GPRS mobile station therefore requires a subscriber identity module (SIM) card in order to operate on a GPRS network, and a RUIM in order to operate on some CDMA networks. Without a valid SIM/RUIM card, a GPRS/UMTS/CDMA mobile station may not be fully functional. Local or non-network communication functions, as well as legally required functions (if any) such as "911" emergency calling, may be available, but mobile station 700 will be unable to carry out any other functions involving communications over the network 700. The SIM/RUIM interface 744 is normally similar to a card-slot into which a SIM/RUIM card can be inserted and ejected like a diskette or PCMCIA card. The SIM/RUIM card can have approximately 64K of memory and hold many key configuration 751, and other information 753 such as identification, and subscriber related information.

When required network registration or activation procedures have been completed, mobile station 700 may send and receive communication signals over the network 719. Signals received by antenna 716 through communication network 719 are input to receiver 712, which may perform such common receiver functions as signal amplification, frequency down conversion, filtering, channel selection and the like, and in the example system shown in FIG. 3, analog to digital (A/D) conversion. A/D conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 719 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Mobile station 700 preferably includes a microprocessor 738 which controls the overall operation of the device. Communication functions, including at least data and voice communications, are performed through communication subsystem 711. Microprocessor 738 also interacts with further device subsystems such as the display 722, flash memory 724, random access memory (RAM) 726, auxiliary input/output (I/O) subsystems 728, serial port 730, keyboard 732, speaker 734, microphone 736, other communication subsystem 740 such as a short-range communications subsystem and any other device subsystems generally designated as 742.

Some of the subsystems shown in FIG. 3 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the microprocessor 738 is preferably stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726.

As shown, flash memory 724 can be segregated into different areas for both computer programs 758 and program data storage 750, 752, 754 and 756. These different storage types indicate that each program can allocate a portion of flash memory 724 for their own data storage requirements. Microprocessor 738, in addition to its operating system functions, preferably enables execution of software applications on the mobile station. A predetermined set of applications that control basic operations, including at least data and voice communication applications for example, will normally be installed on mobile station 700 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 719. In a preferred embodiment, the PIM data items are seamlessly integrated, synchronized and updated, via the wireless network 719, with the mobile station user's corresponding data items stored or associated with a host computer system. Further applications may also be loaded onto the mobile station 700 through the network 719, an auxiliary I/O subsystem 728, serial port 730, short-range communications subsystem 740 or any other suitable subsystem 742, and installed by a user in the RAM 726 or preferably a non-volatile store (not shown) for execution by the microprocessor 738. Such flexibility in application installation increases the functionality of the device and may provide enhanced on-device functions, communication-related functions, or both. For example, secure communication applications may enable electronic commerce functions and other such financial transactions to be performed using the mobile station 700.

In a data communication mode, a received signal such as a text message or web page download will be processed by the communication subsystem 711 and input to the microprocessor 738, which preferably further processes the received signal for output to the display 722, or alternatively to an auxiliary I/O device 728. A user of mobile station 700 may also compose data items such as email messages for example, using the keyboard 732, which is preferably a complete alphanumeric keyboard or telephone-type keypad, in conjunction with the display 722 and possibly an auxiliary I/O device 728. Such composed items may then be transmitted over a communication network through the communication subsystem 711.

For voice communications, overall operation of mobile station 700 is similar, except that received signals would preferably be output to a speaker 734 and signals for transmission would be generated by a microphone 736. Alternative voice or audio I/O subsystems, such as a voice message recording subsystem, may also be implemented on mobile station 700. Although voice or audio signal output is preferably accomplished primarily through the speaker 734, display 722 may also be used to provide an indication of the identity of a calling party, the duration of a voice call, or other voice call related information for example.

Serial port 730 in FIG. 3, would normally be implemented in a personal digital assistant (PDA)-type mobile station for which synchronization with a user's desktop computer (not shown) may be desirable, but is an optional device component. Such a port 730 would enable a user to set preferences through an external device or software application and would extend the capabilities of mobile station 700 by providing for information or software downloads to mobile station 700 other than through a wireless communication network. The alternate download path may for example be used to load an encryption key onto the device through a direct and thus reliable and trusted connection to thereby enable secure device communication.

Other communications subsystems 740, such as a short-range communications subsystem, is a further optional component which may provide for communication between mobile station 700 and different systems or devices, which need not necessarily be similar devices. For example, the subsystem 740 may include an infrared device and associated circuits and components or a Bluetooth™ communication module to provide for communication with similarly enabled systems and devices.

As will be appreciated by those skilled in the art, preferably wireless devices 10, 110 and mobile station 700 are the same device. Further network 719 and network 120 are preferably the same.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

I claim:

1. A timeout delay system configured to delay timeout of an application on a wireless device communicating over a network, timeout being caused by a response to a data request not being received within a timeout period, the timeout delay system comprising:
    a proxy configured to register the data request from the application to the network, the application running on the wireless device;
    a counter for measuring a predetermined time interval, the time interval being selected to prevent timeout at the application;
    a transmitter configured to send preventative data to the application after the counter has expired but before an anticipated response is received, the preventative data forming part of the anticipated response to the data request;
    the proxy configured to modify a response received from the network to remove preventative data already sent to the application, thereby creating a modified response; and
    the transmitter configured to forward the modified response to the application,
wherein the system registers that the request has been sent and waits the counter interval, and if the response has not been received during the counter interval, sends the preventative data to the application to delay a timeout, the application receiving the preventative data as part of the response.

2. The system of claim 1, wherein the application is application employing the HTTP protocol for communication.

3. The system of claim 2, wherein a transport layer for the network is a TCP layer.

4. The system of claim 2, wherein the preventative data is a response header.

5. The system of claim 4, wherein the response header is a string having the characters "HTTP/1."

6. The system of claim 5, wherein the means for sending preventative data sends individual bytes of the response header.

7. The system of claim 4, wherein the preventive data is a plurality of bytes of a portion of the response header.

8. The system of claim 1, wherein the timeout delay system resides on the device on a path between the application and the network.

9. The system of claim 1, wherein the timeout delay system resides on a customer premise equipment on the path between the application and the network.

10. The system of claim 1, wherein the timeout delay system resides in a distribution portion of the network on the path between the application and a core of the network.

11. A method for delaying a timeout of an application on a wireless device communicating over a network, timeout being caused by a response to a data request not being received within a timeout period, the method comprising:
    registering that the data request has been sent by the application running on the wireless device over the network;
    waiting a predetermined interval selected to prevent the timeout;
    if a response to the request has not been received from the network,
        sending preventative data to the application to prevent the timeout, the preventative data forming part of an anticipated response to the data request; and
        repeating the waiting step; and
    if the response to the request is received from the network,
        modifying the received response to remove from the response preventative data already sent to the application; and
        forwarding the modified response to the application,
the receipt of each timeout preventative data at the application as part of the response causes the application to postpone the timeout.

12. The method of claim 11, wherein the data sent in the sending step is header information.

13. The method of claim 12, wherein the application uses an HTTP layer.

14. The method of claim 13, wherein the header information is a substring with characters of "HTTP/1."

15. The method of claim 12, wherein sending the timeout preventive data includes sending one byte of the header information after the predetermined interval.

16. The method of claim 12, wherein sending the timeout preventive data includes sending multiple bytes of the header information after the predetermined interval.

17. The method of claim 12, wherein selecting the fragment of header information is subject to a finite amount of header information, generating the timeout preventive data being subject to availability of unique header information.

* * * * *